US009314923B2

(12) United States Patent
Cianchetti et al.

(10) Patent No.: US 9,314,923 B2
(45) Date of Patent: Apr. 19, 2016

(54) BIO-INSPIRED CONTINUOUS ROBOTIC LIMB

(75) Inventors: Matteo Cianchetti, Perugia (IT); Maurizio Follador, Givoletto (IT); Andrea Arienti, Leghorn (IT); Cecilia Laschi, Leghorn (IT); Barbara Mazzolai, Castiglioncello (IT); Paolo Dario, Lorenzana (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 436 days.

(21) Appl. No.: 13/823,102

(22) PCT Filed: Sep. 14, 2011

(86) PCT No.: PCT/EP2011/065939
§ 371 (c)(1),
(2), (4) Date: Mar. 13, 2013

(87) PCT Pub. No.: WO2012/035064
PCT Pub. Date: Mar. 22, 2012

(65) Prior Publication Data
US 2013/0167683 A1 Jul. 4, 2013

(30) Foreign Application Priority Data
Sep. 16, 2010 (IT) .................. FI2010A0195

(51) Int. Cl.
*B25J 9/00* (2006.01)
*B25J 9/10* (2006.01)
*B25J 18/06* (2006.01)

(52) U.S. Cl.
CPC ................ *B25J 9/1085* (2013.01); *B25J 18/06* (2013.01); *Y10T 74/20305* (2015.01)

(58) Field of Classification Search
CPC ............ B25J 9/10; B25J 9/108; B25J 18/065; B25J 9/1085; F03G 7/06; F03G 7/065
USPC ...................... 74/490.01, 490.04; 901/19, 21
See application file for complete search history.

(56) References Cited

U.S. PATENT DOCUMENTS

| 4,900,218 A | 2/1990 | Sutherland |
| 4,976,191 A | 12/1990 | Suzumori et al. |

(Continued)

FOREIGN PATENT DOCUMENTS

| JP | 1-132940 | * 5/1989 |
| JP | 1-306361 | * 12/1989 |
| JP | 2008121783 | 5/2008 |
| WO | 98/49976 | 11/1998 |

OTHER PUBLICATIONS

Vaidyanathan, R. et al., A hydrostatic robot for marine applications, Robotics and Autonomous Systems 2000, 30: 103-113.

(Continued)

*Primary Examiner* — William C Joyce
(74) *Attorney, Agent, or Firm* — Steinfl & Bruno LLP

(57) ABSTRACT

A robotic limb is described. The robotic limb has a closed tubular casing made of viscoelastic material defining a chamber containing an incompressible fluid. The closed tubular casing has a sheath formed by substantially inextensible intertwined wires. In the chamber there are groups of transverse actuators axially spaced from each other, connected to the sheath and adapted to reversibly contract the closed tubular casing at least partly in the radial direction. The robotic limb also has longitudinal actuators adapted to reversibly contract the closed tubular casing at least partly in the axial direction being connected to each of the groups of transverse actuators.

12 Claims, 4 Drawing Sheets

(56) References Cited

U.S. PATENT DOCUMENTS

| 5,727,391 | A | * | 3/1998 | Hayward | B25J 9/1085 |
| | | | | | 248/636 |
| 6,139,573 | A | * | 10/2000 | Sogard et al. | 623/1.13 |
| 6,216,554 | B1 | * | 4/2001 | Kimura et al. | 74/502.5 |
| 8,245,799 | B2 | * | 8/2012 | Chiel et al. | 180/7.1 |
| 2006/0174761 | A1 | | 8/2006 | Asai et al. | |
| 2007/0144299 | A1 | | 6/2007 | Okazaki | |

OTHER PUBLICATIONS

Liang, Y. et al., A finite element simulation scheme for biological muscular hydrostats, J. Theoretical Biology 2006, 242: 142-150.

PCT International Search Report mailed on Nov. 2, 2011 for PCT Application PCT/EP2011/065939 filed on Sep. 14, 2011 in the name of Scuola Superiore Di Studi Univeritari E Di . . . .

PCT Writen Opinion mailed on Nov. 2, 2011 for PCT Application PCT/EP2011/065939 filed on Sep. 14, 2011 in the name of Scuola Superiore Di Studi Univeritari E Di . . . .

Mazzolai, B., et al., Biorobotic Investigation on the Muscle Structure of an Octopus Tentacle. Proc. of the 29th Annual Int'l Conf. of the IEEE , Aug. 23-28, 2007, pp. 1471-1474.

Japanese Office Action mailed on Jun. 2, 2015 for Japanese Application No. 2013-528655 filed on Jun. 15, 2011 in the name of Matteo Cianchetti et al.; Japanese original with English Translation.

* cited by examiner

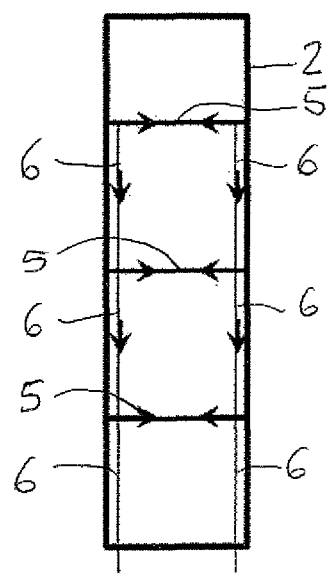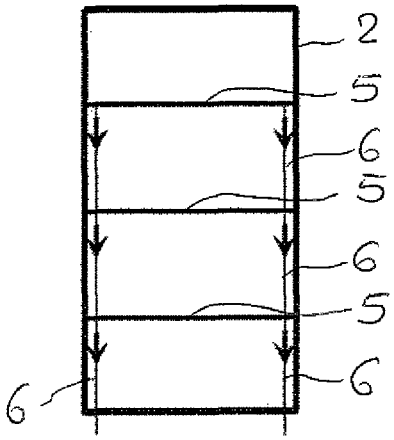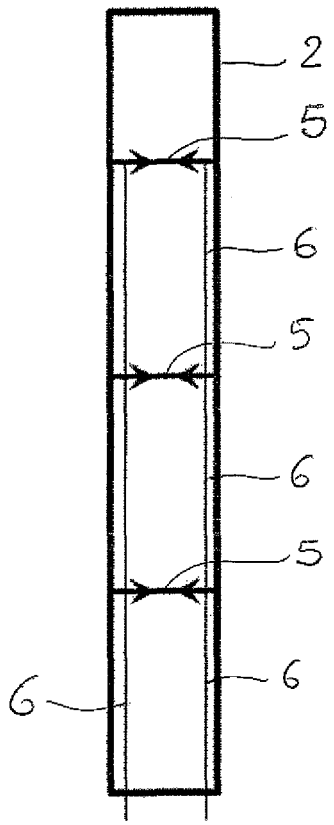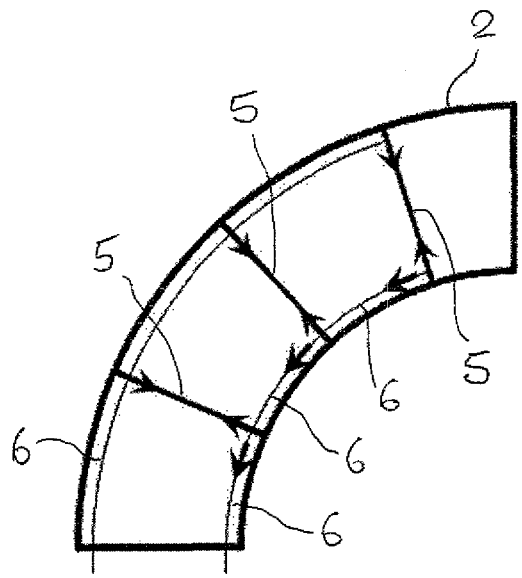
Fig. 5a   Fig. 5b
Fig. 5c   Fig. 5d

BIO-INSPIRED CONTINUOUS ROBOTIC LIMB

CROSS REFERENCE TO RELATED APPLICATIONS

The present application is the US national stage of International Application PCT/EP2011/065939 filed on Sep. 14, 2011 which, in turn, claims priority to Italian Patent Application FI2010A000195 filed on Sep. 16, 2010.

FIELD OF THE INVENTION

The present invention generally regards robotic structures, and in particular it refers to a robotic limb with a bio-inspired continuous structure.

STATE OF THE ART

As known, the arm of *Octopus vulgaris* has many interesting characteristics from a robotic point of view. Such arm is entirely flexible and it has no skeleton or rigid element both inside and outside. These characteristics confer the animal a very high mobility and allow it to perform movements with infinite degrees of freedom. The arm of the Octopus is made up of a "muscular hydrostat", densely filled with muscular fibres, arranged according to a well defined geometry: longitudinal, transverse and oblique muscles. The longitudinal muscles are arranged axially and they are responsible for the shortening and the bending of the arm; the transverse muscles, antagonists with respect to the longitudinal muscles, are arranged radially and the contraction thereof results in a reduction of the section of the arm; the coaction of these muscular groups allows the animal to vary the rigidity thereof.

The expression "muscular hydrostat" (hereinafter referred to as hydrostatic structure) is used to indicate a biological structure exclusively made up of soft tissues (mainly muscles) and thus without a rigid skeleton support. Despite that, this structure is able to deform itself (lengthening, shortening and omnidirectional bending), to modify its rigidity and produce considerable forces due to the particular arrangement of the muscular fibres thereof which have an antagonist action. Furthermore, this muscular system serves as a modifiable skeleton and allows transforming force into movement. The structure is isovolumetric, given that there is no liquid exchange with the external environment.

Among examples of bio-inspired hydrostatic structures, Vaidyanathan R. et al., (*A hydrostatic robot for marine applications*, Robotics and Autonomous Systems, 2000, 30103-113) describes a robotic device made up of a series of silicone spheres filled with fluid and moved with SMA springs inspired to the anatomy of a caterpillar. Y. Liang. et al., (*A finite element simulation scheme for biological muscular hydrostats*, Journal of Theoretical Biology, 242, 2006, 142-150) conducts a similar simulation to the finite elements of a tentacle of cuttlefish and other hydrostatic structures which simulate the mutual action of the various muscles and of the active and passive characteristics thereof. Mazzolai B. et al. (*Biorobotic investigation on the muscle structure of the Octopus tentacle*, Proceedings of the 29th Annual International conference of the IEEE EMBS, Lyon, France, Aug. 23-26, 2007, pages 1471-1474) discloses biomechanical studies carried out on samples of arms of Octopus vulgaris and a mock-up model of the arm composed by three transversal layers and by four longitudinal cylinders made of hard silicone simulating the arm' muscles, actuated by a cable actuation system.

The articulated robotic structures are generally used for making robotic limbs such as for example manipulator arms. Structures of this type are widely known and made up of rigid mechanical parts connected to each other by joints which confer the structure the required degrees of freedom. In addition, it would be very appreciated to have a robotic arm that is completely soft (thus yieldable, highly deformable and intrinsically safe) to perform movements, generate forces and handle objects even in particularly complex environments which require a high amount of degree of freedom.

Thus, the technical problem addressed by the present invention is that of providing a robotic limb with a structure without joints (thus continuous) or rigid mechanical parts (hence soft), inspired to the arm of *Octopus vulgaris* capable of performing passive lengthening (simply due to transverse necking), shortening, bending and selective stiffening of a part of the structure.

SUBJECT AND SUMMARY OF THE INVENTION

Thus, the general subject of the present invention is to provide a robotic limb inspired to the arm of an octopus so as to have a substantially continuous configuration.

A further subject of the invention is to provide a robotic limb of the aforementioned type capable of replacing the current known manipulators based on the principles of conventional robotics and mainly made up of joints and rigid parts.

According to the present invention, in order to artificially simulate the "muscular hydrostat" of a biological limb reproducing the performance thereof from a structural and functional point of view, extremely soft and flexible materials, which allow nearing the mechanical characteristics of the biological tissue, were used. In particular substantially viscoelastic materials such as silicone or elastomers with viscoelastic properties similar to silicone or generally polymers with low Young's modulus (in the order of tens of kPa) which can be subjected to large deformations (>500%) without undergoing permanent deformations were used. Furthermore artificial contractile elements arranged longitudinally and transversely to reproduce the functions performed by the muscular fibres present in the biological limb were used. The passive lengthening of the entire structure is generated by a reduction of the diameter due to the contraction of the transverse units. The longitudinal contraction is instead exploited for shortening (simultaneous actuation of several longitudinal units), for the bending movement (actuation of only one longitudinal unit) and for stiffening the structure (co-contraction with the transverse units).

According to an essential aspect of the present invention the robotic limb comprises a sheath formed by substantially inextensible intertwined wires, inside said sheath being placed groups of transverse actuators axially spaced from each other, connected to said sheath, and adapted to reversibly contract said sheath at least partly in the radial direction, longitudinal actuating means being connected to each of said groups of transverse actuators adapted to reversibly contract said sheath at least partly in the axial direction.

In a variant of the robotic limb of the present invention, the limb further comprises a closed tubular casing made of substantially viscoelastic material, said casing incorporating the above said sheath and defining a chamber in which the above said actuators are placed, immersed in an incompressible fluid.

In a preferred embodiment of the invention each group of transverse actuators comprises a plurality of springs made of a shape memory alloy (SMA) electrically supplied extending radially from a common central support and hooked to said sheath.

BRIEF DESCRIPTION OF THE DRAWINGS

Further characteristics and advantages of the robotic limb according to the present invention will be clear from the following description of an embodiment thereof provided solely by way of non-limiting example with reference to the attached drawings wherein:

FIGS. 5a, 5b, 5c, 5d illustrate possible behaviours obtainable by selectively activating the actuators (the arrows indicate the active elements and the direction of application of force): stiffening (FIG. 5a), shortening (FIG. 5b), lengthening (FIG. 5c), bending (FIG. 5d);

DETAILED DESCRIPTION OF THE INVENTION

Figure 1:
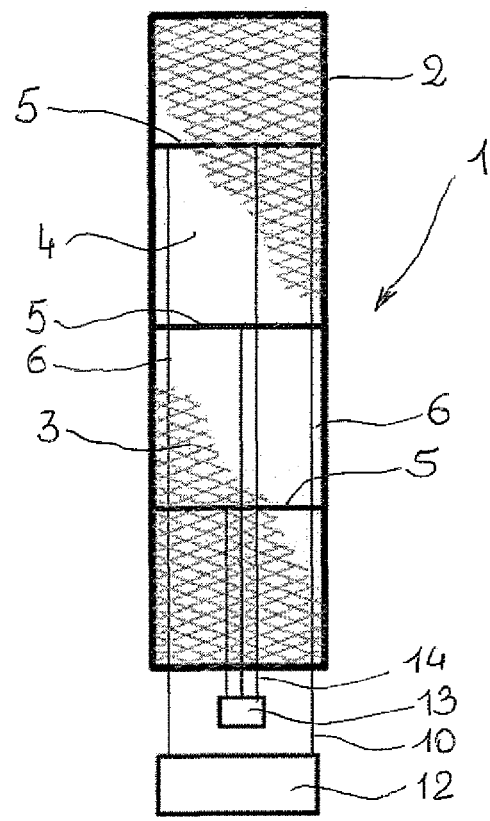
FIG. 1 is a schematic view of a variant of the robotic limb according to the invention, in which the elements crucial for the operation thereof are shown.
Figure 2:
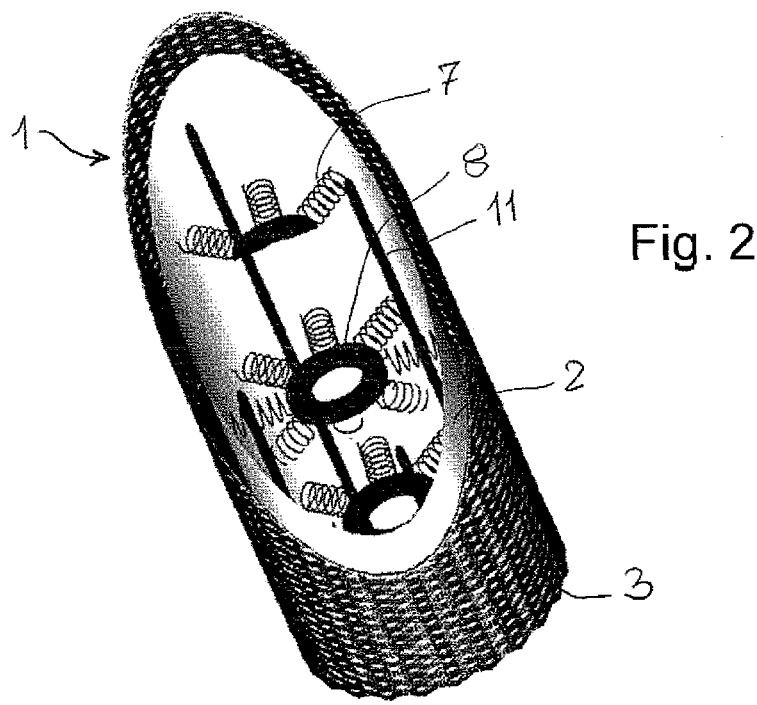
FIG. 2 is a perspective cutaway view of the limb of FIG. 1.

With reference to FIGS. 1 and 2, a variant of the present robotic limb is schematically illustrated therein: the limb, generically indicated with 1, has a hollow cylindrical geometry consisting of a tubular silicone casing 2, in which an intertwined sheath 3 is enclosed reproducing the connective tissue of the arm of the Octopus. The tubular casing 2 is closed at the ends and delimits a chamber 4 filled with an incompressible fluid F which guarantees the isovolumetricity of the structure and facilitates the cooling of the actuators. The role of the silicone casing is to guarantee continuity to the structure and to contain the internal liquid. The intertwined sheath 3 can be positioned either within the wall forming the tubular casing 2 or in the proximity of the inner or outer surfaces thereof, like in the embodiment illustrated herein.

In another embodiment according to the present invention the limb do not comprise the tubular silicone casing 2, but the intertwined sheath 3 as the external surface of the limb, forming an inner space for the placement of the actuators. In this variant the air or the fluid, wherein the limb is immersed during its utilization, freely flow throughout the sheath 3, in and out of the limb structure.

Within the chamber 4 delimited by the casing 2 or within the inner space delimited by the sheath 3 transverse actuators are arranged, generically indicated with 5 in FIG. 1, radially arranged, and longitudinal actuators, generically indicated with 6 in FIG. 1, axially arranged.

In particular, with reference to FIG. 2, the transverse actuators 5, studied as transverse contractile elements, consist of springs 7 made of a shape memory alloy (SMA) and more precisely in the present embodiment of the invention they are formed by groups of eight springs integrated in the same cross-section of the robotic limb and arranged radially equally spaced. Three groups of springs 7 are indicatively schematized in FIGS. 1 and 2, but it is clear that the number of groups can be different also depending on the length of the robotic limb. A source of electrical energy, schematically indicated with 13 in FIG. 1, power supplies each group of springs 7 through the cables 14.

Figure 3:
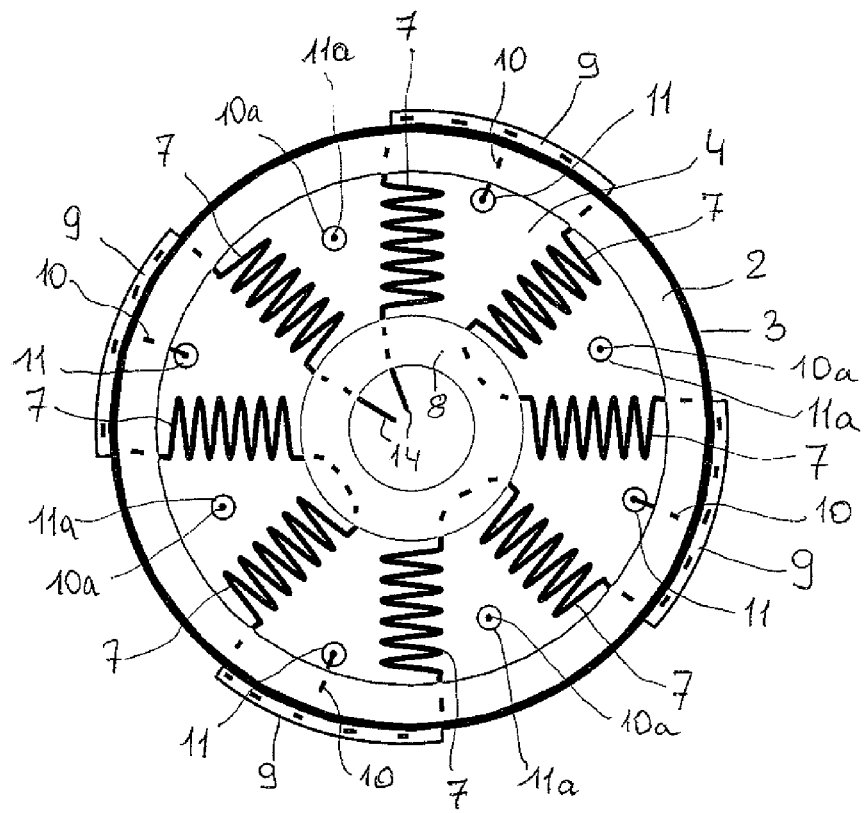
FIG. 3 is a cross-section of the limb according to the invention at a group of transverse actuators.

In the proximity of the axis of the robotic limb 1a central ring 8 is provided to which the springs 7 of the actuator 5 are fixed. Each spring is then fixed to substantially rigid external connection means 9 made of insulating material, fixed to the intertwined sheath 3, shown in FIGS. 3 and 4, which allow transmitting and uniformly distributing the forces exerted by the springs to the sheath and thus to the entire outer surface. In particular the connection means 9 are formed by plates fixed to the outer surface of the silicone casing 2 through which the wire of the springs 7 is passed.

In the illustrated embodiment each group of eight springs 7 is provided by a single wire, hence the springs are electrically arranged in series but mechanically arranged in parallel. Each group of springs 7 thus configured can be made winding the wire on metal cores and mechanically blocking it at the ends of each spring. The memorization of the springs occurs in furnaces. The wire left between one spring and the other serves as an engagement to the central ring 8 and to external connection means 9.

For instance, the formed springs have the following characteristics: diameter of the wire: 0.2 mm; internal diameter of the spring: 1 mm; spring index (ratio between the mean diameter of the spring and the mean diameter of the wire): 6, number of turns: 6.

Figure 4:
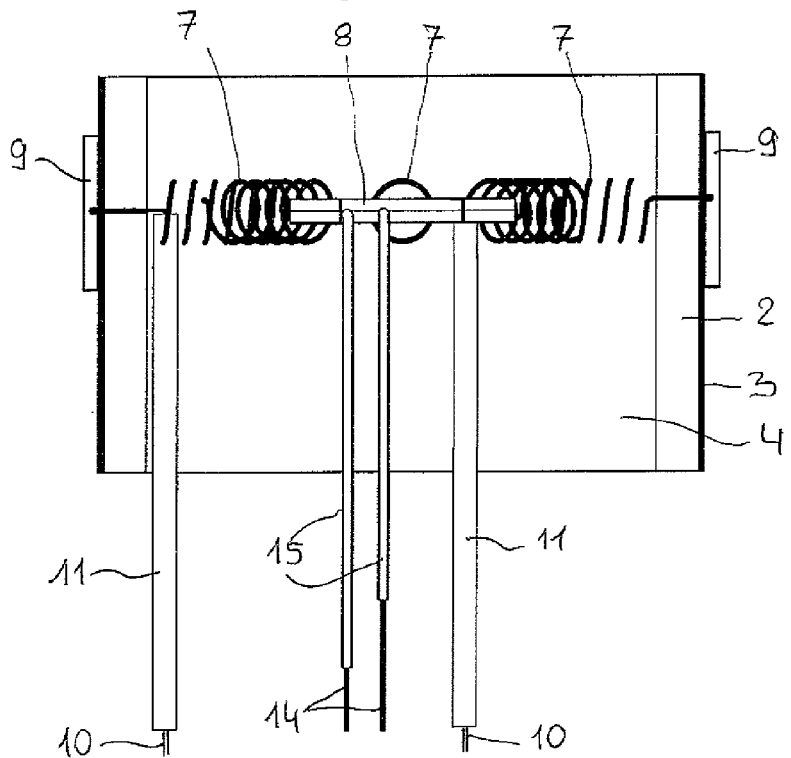
FIG. 4 is a longitudinal section of the limb according to the invention at a group of transverse actuators.

With reference to FIG. 4, the longitudinal actuation is provided through wires 10 made up of high molecular weight polyethylene fibres which slide within the silicone sheaths 11 until it projects from the base of the limb 1 where they are connected to servomotors, schematically indicated with 12 in FIG. 1. To each group of springs 7 four equally spaced longitudinal wires 10 are connected, mechanically fixed to the external connection means 9 for engaging the springs 7. In the FIG. 3, the wires and the respective sheaths which are connected to an axially subsequent group of springs 7 are also indicated with 10a, 11a.

The intertwined sheath 3 is formed by inextensible and intertwined PET (PolyEthylene Terephthalate) wires 13. In the embodiment of the invention provided with the casing 2, the inherent functional properties of the sheath 3 are determined by the angle formed by the sheath's wires with the generator of the silicone casing 2. There is a geometric relation binding this angle, the diameter of the sheath and the length thereof, therefore the variation of the angle corresponds to a diameter reduction and a tubular structure lengthening. The advantage obtained by the introduction of this sheath lies in the fact that a reduction of the diameter of the limb is more easily transformed into a lengthening and at the same time the cross-section maintains a circular shape. In particular, the embodiment of the invention without the casing 2 has a structure that, even if not isovolumetric, allows to maintain the circular shape also when subjected to point forces, does not need to contain fluids inside the structure and performs better in terms of lengthening when compared to isovolumetric structures (up to 35% of radius decrease).

The material making up the sheath is selected so as to have sufficient rigidity to maintain the cylindrical shape when a force is radially applied and other types of weaving-intertwining (like the mesh intertwining) cannot be used due to the fact that they cannot have the same passive lengthening capacity. The fundamental characteristic of this type of intertwining actually lies in the helical arrangement of the fibre along the structure. The only supportable variables are: the presence of bundles of wires instead of single wires and different intertwining architectures: Hercules (each wire or bundle of wires passes above and beneath other 3 wires or wire bundles at each passage), regular (above and beneath other 2) or diamond (above and beneath each one of them).

The SMA springs 7 are activated by the heat generated through Joule effect by the passage of current in the SMA wire that constitutes the springs 7. The activation of the springs causes a continuous circumferential contraction and a lengthening of limb 1 due to the presence of the intertwined sheath 3 which, also when the silicone casing 2 is comprised in the limb, prevents the formation of discontinuity, otherwise generated by the connection between the single springs and the wall of the silicone casing 2, and simultaneously creates a longitudinal component responsible for the lengthening.

The control of the power transmitted to the springs 7 occurs with a PWM (Pulse Width Modulator) calibrated so as to prevent the overheating of the alloy, and each group of springs of the limb 1 can be activated independently. The springs 7 of each group forming a transverse contractile section are activated simultaneously being electrically arranged in series. In a possible variant of embodiment, the springs 7 may be selectively activated. In this case the springs are not formed by a single wire, but they are made as pairs of two and externally engaged to the wire between the two springs and internally to the central ring 8 with the two ends thereof. On one hand, this leads to a greater versatility and the possibility of synergically using single transverse springs and longitudinal cables for modulating the amplitude of the bending, but on the other hand they introduce the need of using a greater number of electric connections.

In the central part of the robotic limb 1 cables 14 are arranged for supplying the actuators and some sensors, not shown, (for example Hall effect sensors) embedded in the same fluid F hooked to the central ring 8 or, alternatively, in a central silicone core, not shown. The sensors arranged within the structure are used for evaluating the functionality of the springs and measuring contraction thereof.

In order to reduce the activation times in a thermally highly dissipative environment, the wire making up the springs 7 and the cables 14 formed by the SMA wire are coated with a PTFE (Poly(TetraFluoroEthylene)) shrinking sheath 15 (thickness 50 μm). This sheath allows maintaining the activation time at around 1 s with lower dissipation of energy, however guaranteeing a quick cooling (depending on the thermal properties of the dissipative liquid). The use of the sheath has a double advantage, increasing the radius of the wire (thus increasing the heat exchange surface in the cooling step) and thermally insulating the wire during heating.

The present invention allows obtaining a continuous structure of a robotic limb and with extremely limited rigid constraints capable of modifying the rigidity thereof and producing shortening, lengthening and bending movements, as shown in FIGS. 5a, 5b, 5c and 5d. In particular FIG. 5a illustrates the lengthening and the radial contraction resulting from a simultaneous actuation of the transverse and longitudinal actuators to generate a substantial stiffening of the limb; FIG. 5b illustrates the axial shortening or contraction deriving from the actuation of the longitudinal actuators alone; FIG. 5c illustrates the radial contraction effect deriving from the actuation of the transverse actuators alone; FIG. 5d illustrates a bending effect deriving from the actuation of the transverse actuators and from a selective actuation of the longitudinal ones.

Given that each group of springs can be independently controlled by the others, due to the continuity of the structure, each force and deformation applied is distributed over the entire structure. A particular advantage lies in the fact that this device allows a passive lengthening generated solely by the reduction of the diameter of the structure.

The advantages with respect to the prior art lie in the substantial absence of stiff elements, which renders the structure entirely "soft", the continuity of actuation, which allows high mobility and exploiting the passive properties of the materials, which allows having a slimmer and smarter use of the forces provided within the structure.

Furthermore, it is possible to exploit the structure in several modules, with different materials and geometries leading to a series of combinations that can privilege different characteristics. For example, it is possible to stack modules with elastomers having different elastic properties (creating more flexible limb parts alternated by other more rigid ones) or the intertwined sheath could be discontinuous hence be conferred with the capacity to bend in a preferential direction. Furthermore, the number and arrangement of the actuator elements could allow finer local controls so as to facilitate possible specific applications. Lastly, the possibility of integrating different types of modules may regard rigid elements (where required) as particular structures or instruments of various types.

A robotic limb obtained using the bio-inspired robotic structure according to the present invention is adapted to exert traction and compression forces, it is capable of gripping and handling objects and operating in narrow spaces, given that it is made up of soft elements capable of being compressed and adapting to the surrounding environment.

The innovative characteristics of the robotic limb according to the present invention make it suitable for various tasks at industrial level. Given that most of the materials used have a density closer to that of water, it has the advantage lying in the fact that it can be used both in submarine environments (where it maintains a neutral set up) and for other purposes (where this property is converted into great lightness). The robotic limb could thus be used for spatial applications, where weight and overall dimensions are determined and have high impact on costs.

Due to the softness of the materials used, the robotic limb according to the present invention can be used in all industrial sectors where handling with care is fundamental, like handling food products, managing archaeological products (submarine and non-submarine), moving medical material as well as performing mini-invasive surgical interventions, and other applications. The fact that it can be compressed makes the robotic limb according to the present invention extremely adapted to the environments that are difficult to reach, with extremely narrow access passages, but which require high mobility, like cleaning pipes, silos, tanks and reservoirs or when removing debris or searching for people in areas affected by natural calamities. Furthermore, the robotic limb according to the present invention can be simply used as a linear actuator capable of exerting both contraction and compression forces.

Figure 6:
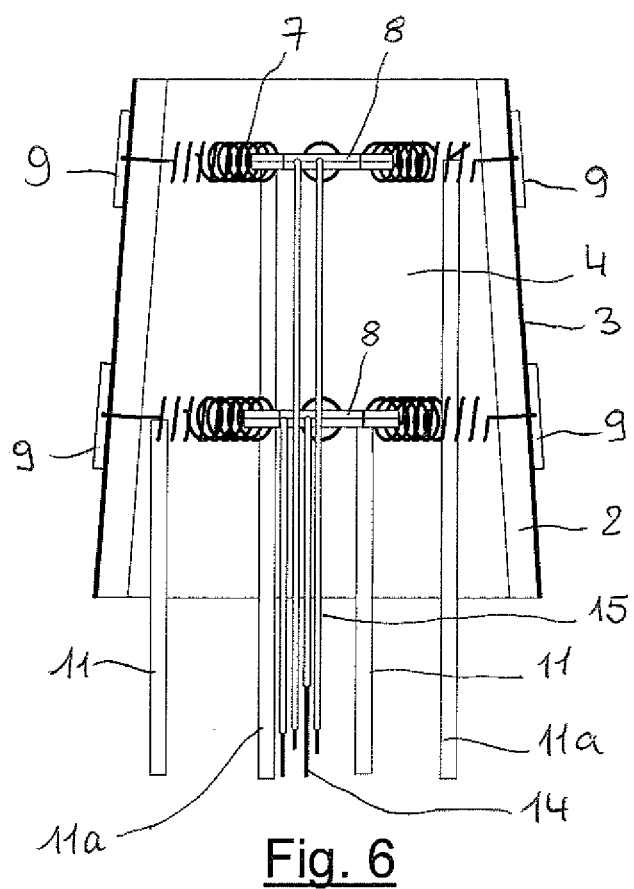
FIG. 6 schematically illustrates—in longitudinal section—another embodiment of the invention in which the robotic limb has a variable section.

Several modules having progressively variable diameter can be axially joined together to create the characteristic structure of a tentacle. Preferably, the connection between the various modules occurs continuously by means of the intertwined sheath and the silicone casing, as shown in FIG. 6. When manufacturing, the various groups of transverse actuators are connected to the external intertwined sheath while the external silicone casing serves as a further connection for the entire structure.

The bio-inspired robotic limb according to the present invention may be subjected to variants and/or modifications without departing from the scope of protection of the invention as defined in the attached claims.

The invention claimed is:

1. A robotic limb comprising:
   a sheath formed by substantially inextensible intertwined wires, inside said sheath being placed groups of transverse actuators axially spaced from each other, connected to said sheath and capable to reversibly contract said sheath at least partially in a radial direction;
   longitudinal actuating means connected to each of said groups of transverse actuators for reversibly contracting said sheath at least partially in an axial direction; and
   a closed tubular casing in a viscoelastic material, said closed tubular casing incorporating said sheath and defining a chamber, said chamber containing an incompressible fluid.

2. The robotic limb according to claim 1, wherein said longitudinal actuating means comprise drive wires extending along said casing in a substantially angularly equally spaced position and connected to said groups of transverse actuators and to motor means for reversibly pulling said drive wires in a selective or simultaneous way.

3. The robotic limb according to claim 2, wherein each group of springs comprises respective longitudinal actuating means comprising said drive wires connected to the external connection means of relevant springs from each group of springs.

4. The robotic limb according to claim 1, wherein each group of said groups of transverse actuators comprises a plurality of springs formed by at least a shape memory alloy wire coated by a heat-shrinking sheath.

5. The robotic limb according to claim 1, wherein said longitudinal actuating means comprises drive wires coated by a silicone sheath.

6. The robotic limb according to claim 1, wherein said closed tubular casing has a variable section.

7. The robotic limb according to claim 1, wherein said groups of transverse actuators and said longitudinal actuating means are capable to be actuated separately to give rise to a limb lengthening or, respectively, a shortening thereof, or to be actuated simultaneously to give rise to a limb stiffening.

8. The robotic limb according to claim 1, wherein said longitudinal actuating means are capable of being selectively actuated to give rise to a limb bending.

9. A robotic limb comprising:
   a sheath formed by substantially inextensible intertwined wires, inside said sheath being placed groups of transverse actuators axially spaced from each other, connected to said sheath and capable to reversibly contract said sheath at least partially in a radial direction; and
   longitudinal actuating means connected to each of said groups of transverse actuators for reversibly contracting said sheath at least partially in an axial direction,
   wherein each of the groups of transverse actuators comprises a plurality of shape memory alloy springs connectable to a power source, radially extending from a common central support and secured to said sheath.

10. The robotic limb according to claim 9, wherein said plurality of shape memory alloy springs is made from a single shape memory alloy wire, wire portions between one shape memory alloy spring and the other one being connected to said common central support and to external connection means fixed to said sheath.

11. The robotic limb according to claim 9, wherein said plurality of shape memory alloy springs is formed by pairs of shape memory alloy springs, each of said pair of shape memory alloy springs being made from a single shape memory alloy wire, a wire portion between the shape memory alloy springs of each pair being connected to said external connection means, the two wire ends being connected to said common central support.

12. The robotic limb according to claim 9, wherein said common central support of the shape memory alloy springs of each plurality of shape memory alloy springs is a ring substantially coaxial to a closed tubular casing, to the sheath or to both the closed tubular casing and the sheath.

* * * * *